United States Patent [19]

Schopper

[11] 4,415,209
[45] Nov. 15, 1983

[54] AN INTEGRAL WHEEL BRAKE CYLINDER AND PRESSURE REGULATING VALVE

[75] Inventor: Bernd Schopper, Hattersheim, Fed. Rep. of Germany

[73] Assignee: ITT Industries, Inc., New York, N.Y.

[21] Appl. No.: 320,394

[22] Filed: Nov. 12, 1981

[30] Foreign Application Priority Data

Dec. 24, 1980 [DE] Fed. Rep. of Germany ....... 3049079

[51] Int. Cl.³ .............................................. B60T 8/26
[52] U.S. Cl. .................................. 303/6 C; 188/349; 188/364
[58] Field of Search ............... 303/6 C; 188/349, 351, 188/361–365, 368, 370, 196 A, 196 R, 369, 72.4, 72.5, 347, 181 T; 91/29, 422, 433, 468, 517; 60/591; 92/75

[56] References Cited

U.S. PATENT DOCUMENTS

| 3,431,730 | 3/1969 | Bueler | 188/351 X |
| 3,669,504 | 6/1972 | Stokes | 303/6 C X |
| 4,266,640 | 5/1981 | Woo | 188/349 X |
| 4,286,504 | 9/1981 | Carré et al. | 188/364 X |
| 4,292,883 | 10/1981 | Riquart et al. | 303/6 C X |

FOREIGN PATENT DOCUMENTS

| 13470 | 2/1956 | Fed. Rep. of Germany | 188/363 |
| 1430226 | 7/1972 | Fed. Rep. of Germany | . |
| 2003565 | 3/1979 | United Kingdom | 303/6 C |
| 2074674 | 11/1981 | United Kingdom | 303/6 C |

Primary Examiner—Douglas C. Butler
Attorney, Agent, or Firm—James B. Raden; Marvin M. Chaban

[57] ABSTRACT

A brake pressure regulating valve inserted inside the pressure chamber of a wheel brake cylinder of a vehicle comprises a differential or stepped piston having its smaller diameter section slidably supported in a bore of a wheel brake cylinder piston and its larger diameter section guided in the bore of a housing for the wheel brake cylinder. The larger diameter section of the stepped piston has an internal bore between an inlet chamber and an outlet chamber. A regulating valve controlling the inlet of the internal bore is provided by a sealing ring resting against a surface of the larger diameter section of the stepped piston adjacent the inlet chamber and an adjacent end of the wheel brake cylinder piston.

9 Claims, 2 Drawing Figures

AN INTEGRAL WHEEL BRAKE CYLINDER AND PRESSURE REGULATING VALVE

BACKGROUND OF THE INVENTION

The present invention relates to a pressure regulating valve for hydraulic brake systems for vehicles comprising a housing with a pressure chamber communicating with a master brake cylinder through an inlet and with at least one brake-actuating cylinder through an outlet, a differential piston arranged in the pressure chamber and acted upon towards the outlet by a spring, the piston's larger surface being exposed to the outlet pressure while its smaller surface is exposed to the inlet pressure, an elastomeric sealing ring arranged in the pressure chamber between inlet and outlet and bounding a first passageway which extends from the inlet to the outlet and is adapted to be closed by axial displacement of the differential piston on attainment of a pressure in the inlet and the outlet which is predetermined by the differential piston surfaces and the spring, the sealing ring including on its side close to the inlet a sealing lip cooperating with the wall of the pressure chamber and closing a second passageway in the event of a pressure gradient from the inlet to the outlet and opening it in the event of a pressure gradient in the opposite direction, the sealing ring being held in pressure-sealed engagement with the differential piston, is supported on a shoulder of the differential piston adjacent the outlet chamber, forming the first passageway with its end surface adjacent the inlet chamber and with an opposite sealing surface, and in that a connecting channel in the differential piston connects the first passageway to the outlet chamber.

Pressure regulating valves of this type are preferably inserted in the brake line between the master brake cylinder and the brake-actuating cylinder of the rear wheels in order to reduce in higher brake pressure ranges the brake pressure of the rear wheel brakes relative to that of the front wheel brakes to take into account the dynamic axle load transfer while braking. These pressure regulating valves are usually installed in an appropriate position in the vehicle and connected by brake lines with the master and the wheel brake cylinders.

The conventional brake unit having functional elements of simple construction but separately arranged is in many respects not satisfactory, since each functional element requires a separate housing and corresponding connecting lines. High costs for material, machining and assembly will be incurred thereby.

German Patent DE-AS No. 1,430,226 discloses a pressure regulating valve which is integrated in a wheel brake cylinder. However, the construction of this device is so complicated that it was not successful in practice.

SUMMARY OF THE INVENTION

It is, therefore, an object of the present invention to integrate a pressure regulating valve of the type initially referred to hereinabove into a wheel brake cylinder while maintaining a simple construction.

A feature of the present invention is the provision of a pressure regulating valve for hydraulic brake systems for vehicles comprising: a wheel brake cylinder housing having a first bore therein coaxial of a longitudinal axis; at least a first wheel brake cylinder piston disposed in the first bore coaxial of the axis, the first piston and the first bore defining an inlet chamber connected to a master cylinder inlet; a stepped pressure-regulating piston having a smaller diameter section slidable in a second bore disposed in the first piston coaxial of the axis and a larger diameter section slidable in the first bore, a first surface of the larger diameter remote from the smaller diameter section providing a first boundary for an outlet chamber, the larger diameter section having a third bore therein coaxial of the axis coupling the inlet chamber with the outlet chamber; a valve arrangement to open and close the third bore including a sealing ring disposed on a second surface of the larger diameter section of the stepped piston parallel to the first surface adjacent the smaller diameter section of the stepped piston and an end surface of the first piston adjacent the sealing ring; and a first spring acting on the stepped piston disposed between the sealing ring and the first piston.

The arrangement according to the present invention provides for a wheel brake cylinder with an integrated pressure regulating valve, which is of straightforward construction and reliable in operation and which, on top of that, will require only little additional expenditure compared to a wheel brake cylinder without a pressure regulating valve. The device according to the present invention enables the saving of costs for material and assembly and also to reduce the weight in comparison with conventional brake units.

In a special embodiment of the subject matter of the present invention, the outlet chamber is bounded by a larger-diameter section of the differential piston and by an end wall of the housing. Such an arrangement will be chosen if there exists only one single wheel cylinder piston.

According to a preferred embodiment of the subject matter of the present invention, the outlet chamber is bounded by a larger-diameter section of the differential piston and by a second wheel brake cylinder piston. In this arrangement, one of the wheel brake cylinder pistons is subjected to controlled pressure over its entire surface, while the other wheel brake cylinder piston is subjected thereto over part of its surface. This enables the transmission of force onto both wheel brake cylinder pistons to be freely varied.

To obtain a defined valve closure travel, a ring is provided which abuts at a step of a wheel brake cylinder and is held by an indentation in the wheel brake cylinder immovable relative to the latter, the ring has a radially inwardly disposed section which bears against a step of the differential piston. The ring also serves as a support for the spring.

In order to avoid large lost travels and the lost fluid displacement resulting therefrom when applying the brake, it will be advantageous to arrange for a second spring to be located between the two wheel brake cylinder pistons and to preload the two wheel brake cylinder pistons to assume a defined inactive position. This second spring may in a simple manner be placed so as to be supported on the inside of the second wheel brake cylinder piston and on the side of the differential piston close to the outlet chamber. The force of the second spring will be transmitted via the differential piston and the first spring onto the first wheel brake cylinder piston in this device. For the purpose of attaining a direct force effect of the second spring on the first piston, it will be expedient to have the differential piston constructed substantially as a hollow piston whose smaller-diameter end is closed and whose larger-diameter end is opened, and to have the second spring extend into this hollow end portion and be supported on a cross member which projects through openings in the differential piston and communicates with the first wheel brake cylinder piston.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

Figure 1:
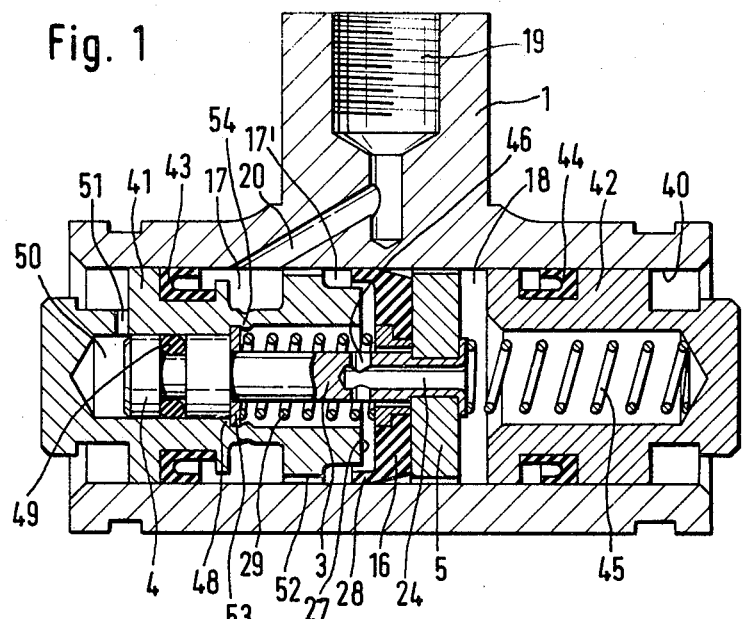
FIG. 1 is a longitudinal cross-sectional view of a first embodiment of a wheel brake cylinder with an integrated pressure regulating valve in accordance with the principles of the present invention.

The wheel brake cylinder illustrated in FIG. 1 shows a housing 1 having a bore 40 in which two wheel brake cylinder pistons 41 snd 42 are located slidably in opposite directions and sealed relative to the wall of the housing 1 by means of seals 43 and 44. The two wheel cylinder pistons 41 and 42 are constructed substantially as hollow pistons, and a differential or stepped piston 3 has a smaller-diameter section 4 guided in the first wheel brake cylinder piston 41 and sealed relative thereto by means of a seal 49. The larger-diameter section 5 of stepped piston 3 is placed between wheel brake cylinder piston 41 and 42 and is guided in housing bore 40. On the side of larger-diameter section 5 of piston 3, adjacent first wheel brake cylinder piston 41, a sealing ring 16 is located including a sealing lip 28 which extends in the direction of first wheel brake cylinder piston 41 and abuts at the wall of housing bore 40.

First wheel brake cylinder piston 41 has a step 48 in the bore accommodating piston 3, which step joins into an enlarged bore section. Abutting at step 48 is a ring 53 which is held by an indentation 54 in wheel brake cylinder piston 41 immovable relative to the latter. With its radially inwardly disposed section, ring 53 bears against a step of piston 3.

Inserted between ring 53 and piston 3 in the enlarged bore section is a compression spring 29 which preloads piston 3 in the direction of the second wheel brake cylinder piston 42. By virtue of spring 29, the valve which is formed by a sealing surface 27 at first wheel brake cylinder piston 41 and by the sealing ring 16 will be kept in its open position beneath a specific pressure level.

The location of ring 53 and the steps at wheel brake cylinder piston 41 and piston 3 cooperating therewith provide a simple way to adjust a defined valve clearance.

An inlet chamber 17 which is formed between first wheel brake cylinder piston 41 and the housing 1 communicates via a bore 20 with a pressure fluid port 19. The inlet chamber comprises two sections 17 and 17' which are interconnected via axial grooves 52 in the wheel brake cylinder piston 41. The pressure chamber 18 which is formed between piston 3 and second wheel brake cylinder piston 42 corresponds to the outlet chamber of a pressure regulator and will therefore be named outlet chamber 18 in the following. Outlet chamber 18 communicates with inlet chamber 17' via an opening 46 and a connecting channel 24. Disposed in outlet chamber 18 is a second spring 45 which has one end supported by second wheel brake cylinder piston 42 and its other end supported by piston 3. Spring 45 serves to keep the lost travel of wheel brake cylinder pistons 41 and 42 and, thus, also the lost fluid displacement small.

The end surface of smaller-diameter section 4 of piston 3 bounds a hollow end portion 50 which is formed in first wheel brake cylinder piston 41 and which communicates with the atmosphere via a bore 51.

Figure 2:
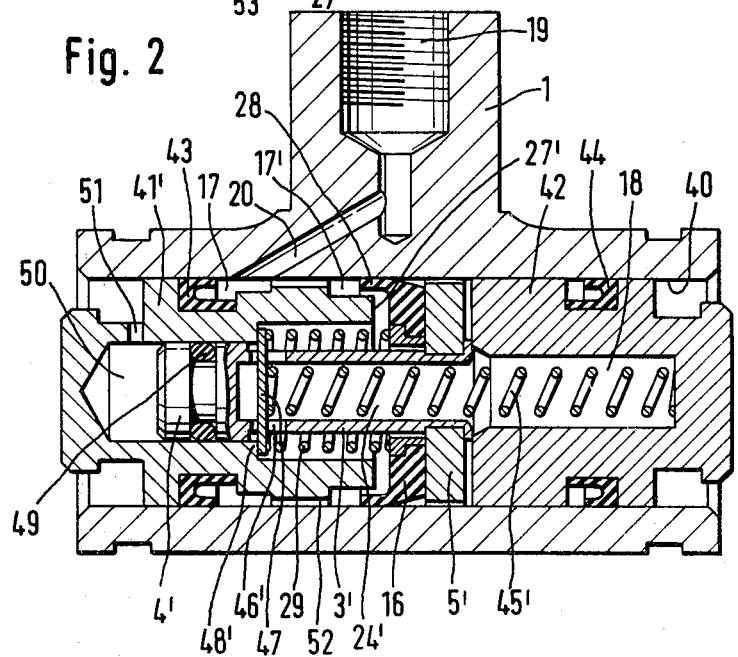
FIG. 2 is a longitudinal cross-sectional view of a second embodiment of a wheel brake cylinder with an integrated pressure regulating valve in accordance with the principles of the present invention.

The wheel brake cylinder illustrated in FIG. 2 is a modification of the wheel brake cylinder of FIG. 1 with the modified components of FIG. 1 being identified in FIG. 2 by the same reference characters primed. The wheel brake cylinder of FIG. 2 differs from that one in FIG. 1 only in that the opening 46' is located in the area of step 48' of first wheel brake cylinder piston 41'. This enables a cross member 47 which bears against step 48' of first wheel brake cylinder piston 41' to extend through openings 46'. In this embodiment, the second spring 45' is supported between cross member 47 and second wheel brake cylinder piston 42. This way, second spring 45' will act through cross member 47 on first wheel brake cylinder piston 41' directly and not be the intermediary of piston 3 and first spring 29, as is the case with the first embodiment of FIG. 1.

The mode of operation of the two wheel brake cylinders with integrated pressure regulating valve described hereinbefore is the same, therefore the operation will be described with reference to the embodiment of FIG. 1. In the inactive position of the device, all components will assume that position that is shown in FIGS. 1 and 2. If pressure is generated by a master cylinder this pressure will propagate through channel 20 into inlet chamber 17 as well as through grooves 52 and beyond the opened valve through openings 46 into outlet 18. Both wheel brake cylinder pistons 41 and 42 are acted upon by the uncontrolled pressure. Upon attainment of a specific pressure level, piston 3 will be displaced in opposition to the force of spring 29, and the valve formed by the components 16 and 27 will close as a result. A reduced pressure increase in outlet chamber 18 will now ensue from a further pressure increase on the inlet side. Since first wheel brake cylinder piston 41 is constructed so as to expose only small effective pressure surface to the inlet pressure, both wheel brake cylinder pistons 41 and 42 will be acted upon by approximately equally high pressure forces. When the pressure is decreased on the inlet side and a pressure gradient is caused thereby from the outlet chamber to the inlet chamber, sealing lip 28 will be lifted from the wall of bore 40 and will thus enable a pressure reduction in outlet chamber 18.

While I have described above the principles of my invention in connection with specific apparatus, it is to be clearly understood that this description is made only by way of example and not as a limitation to the scope of my invention as set forth in the objects thereof and in the accompanying claims.

I claim:
1. A pressure regulating valve for hydraulic brake systems for vehicles comprising:
a wheel brake cylinder housing having a first bore therein coaxial of a longitudinal axis;
at least a first wheel brake cylinder piston disposed in said first bore coaxial of said axis, said first piston and said first bore defining an inlet chamber connected to a master cylinder inlet;

a stepped pressure regulating piston having a smaller diameter section slidable in a second bore disposed in said first piston coaxial of said axis and a larger diameter section slidable in said first bore, a first surface of said larger diameter section remote from said smaller diameter section providing a first boundary for an outlet chamber, said larger diameter section having a third bore therein coaxial of said axis coupling said inlet chamber with said outlet chamber;

a valve arrangement to open and close said third bore including a sealing ring disposed on a second surface of said larger diameter section of said stepped piston parallel to said first surface adjacent said smaller diameter section of said stepped piston and an end surface of said first piston adjacent said sealing ring; and a first spring, acting on said stepped piston, disposed between said sealing ring and said first piston.

2. A regulating valve according to claim 1, wherein a second boundary of said outlet chamber is provided by an end wall of said housing.

3. A regulating valve according to claim 1, wherein a second boundary of said outlet chamber is provided by an end of a second wheel brake cylinder piston disposed in said first bore coaxial of said axis.

4. A regulating valve according to claim 3, further including a second spring disposed in said housing coaxial of said axis to preload said first and second pistons to assure a defined inactive position.

5. A regulating valve according to claim 4, wherein said second spring has one end thereof bearing against a closed end of a fourth bore coaxial of said axis disposed in said second piston and the other end thereof bearing on said first surface of said larger diameter section of said stepped piston.

6. A regulating valve according to claim 4, wherein said stepped piston is a hollow piston having said smaller diameter section end closed and said larger diameter section end open, and said second spring has one end thereof bearing adjacent a closed end of a fourth bore coaxial of said axis disposed in said second piston and the other end thereof bearing against a cross member extending through radial openings in said hollow piston adjacent said closed smaller diameter section end, said cross member abutting against a step in said second bore.

7. A regulating valve according to claim 5, further including a ring abutting a step in said second bore and held immovable thereagainst by a spaced projection in said second bore, said ring having a radially inwardly disposed section bearing against a step of said stepped piston, said ring having one end of said first spring bearing thereagainst.

8. A regulating valve according to claim 4, further including a ring abutting a step in said second bore and held immovable thereagainst by a spaced projection in said second bore, said ring having a radially inwardly disposed section bearing against a step of said stepped piston, said ring having one end of said first spring bearing thereagainst.

9. A regulating valve according to claims 1 or 3, further including a ring abutting a step in said second bore and held immovable thereagainst by a spaced projection in said second bore, said ring having a radially inwardly disposed section bearing against a step of said stepped piston, said ring having one end of said first spring bearing thereagainst.

* * * * *